United States Patent [19]

Notz et al.

[11] Patent Number: 4,840,060

[45] Date of Patent: Jun. 20, 1989

[54] ARRANGEMENT FOR THE DETERMINATION OF THE INJECTION PROGRESS IN AN INTERNAL COMBUSTION ENGINE

[75] Inventors: Wolfgang Notz, Puchheim; Volker Schwarz, Weinstadt; Ulrich Augustin, Kernen, all of Fed. Rep. of Germany

[73] Assignee: Daimler-Benz Aktiengesellschaft, Stuttgart, Fed. Rep. of Germany

[21] Appl. No.: 167,111

[22] Filed: Mar. 11, 1988

[30] Foreign Application Priority Data

Mar. 12, 1987 [DE] Fed. Rep. of Germany ....... 3707927

[51] Int. Cl.[4] ............................................ G01M 15/00

[52] U.S. Cl. .............................. 73/119 A; 364/431.05

[58] Field of Search ............... 73/119 A, 168; 239/73; 364/431.05

[56] References Cited

U.S. PATENT DOCUMENTS 4,438,496 3/1984 Ohie .............................. 364/431.05

*Primary Examiner*—Jerry W. Myracle

*Attorney, Agent, or Firm*—Barnes & Thornburg

[57] ABSTRACT

A arrangement for determining the injection course in an internal combustion engine in which the injection development could not be used heretofore in practice as guide magnitude in the engine control because no stationary measuring sensors are available for the pressure in the injection valve and a through-flow measurement at the feed line to the injection valve is very inaccurate by reason of the occurrence of gas, respectively, vapor bubbles. According to the present invention, the pressure in the injection valve, respectively, the quantity or the flow of the occurring injection medium is derived by a computer from signals of measurement transmitters which determine the stroke of the closure element of the injection valve and the pressure in the feed line to the injection valve or the force with which the closure element of the injection valve abuts in its open end position at an abutment.

26 Claims, 2 Drawing Sheets

ARRANGEMENT FOR THE DETERMINATION OF THE INJECTION PROGRESS IN AN INTERNAL COMBUSTION ENGINE

BACKGROUND AND SUMMARY OF THE INVENTION

The present invention relates to an arrangement for the determination of the injection progress in an internal combustion engine or the like having an injection pump and at least one injection valve connected by way of a line with the pressure side of the injection pump, whose injection nozzle is adapted to be closed off by means of a closure element—as a rule in the shape of a needle—which is displaceably arranged in the manner of a piston in a nozzle pre-chamber connected with the line and is acted upon in the opening direction by the pressure of the injection medium supplied by way of the line against a return force, and which additionally includes a stroke transmitter or lift pick-up which is drivingly coupled with the closure element and which is connected with a computer for processing signals that reproduce the stroke or lift position of the closure element.

A corresponding arrangement is disclosed in the DE-OS No. 31 22 553. In this arrangement, the signals of the stroke transmitter or lift pick-up serve to determine the opening degree of the injection valve so that after a determination of the respective pressure conditions at the nozzle, the injection development can be determined. A strain gauge or the like serves for determining the pressure at the injection nozzle, which is arranged at the nozzle body near a feed line for the injection medium extending through the nozzle body and is intended to react to deformations of the nozzle body which are caused by the pressure of the fuel supplied to the nozzle. One starts thereby with the premise that the deformations of the nozzle body take place analogously to the changes of the pressure of the supplied injection medium.

However, with this known arrangement it remains without consideration that deformations of the nozzle body may have very different causes and by no means are determined alone by the pressure of the supplied injection medium. For example, the nozzle body also suffers changes in shape by reason of temperature influences as well as vibrations of an engine. As to the rest, a more or less large phase displacement occurs between pressure changes in the injection medium and the shape changes of the nozzle body. All of these effects lead to the fact that especially with fast-running engines, larger errors have to be accepted if the pressure conditions are determined in analogy to shape changes of the nozzle body.

It is additionally aggravating that the line leading from the injection pump to the injection valve is relieved between injection operations with customary engines under formation of gas and vapor bubbles inside of the line in order to assure a completely satisfactory closing of the injection valve. At the beginning of each injection operation, these gas, respectively, vapor bubbles must be initially filled out by supply of injection medium. This filling operation causes additional pressure fluctuations in the injection medium which again have as a consequence phase-displaced shape changes of the nozzle body. Under some circumstances, also shock waves occur thereby in the injection medium which have a strongly deviating characteristic compared to the vibrations excited in the nozzle holder.

It must additionally be taken into consideration that the opening periods, as well as the closing periods of the closure element fill out in fast-running engines a relatively large proportion with respect to time of the respective injection operation. Errors which occur in the determination of the pressure condition during the opening periods have correspondingly a considerable influence.

An arrangement for the determination of the injection course is disclosed in the publication "MTZ (Motortechnische Zeitschrift) 21 (1960) 5, pages 175 et seq., in which in lieu of the pressure at the nozzle, the pressure at the inlet of the nozzle holder is measured. This arrangement is necessarily inaccurate because during the injection operation necessarily occurring pressure waves in the injection system have a finite expansion velocity so that between the arrival of a pressure wave at the nozzle and at the inlet of the nozzle holder, a larger phase displacement must occur. Especially with high speed engines, this phase displacement cannot be simply neglected. Added thereto is the fact that at the begining of the injection operation, the pressure at the nozzle also rises time-delayed with respect to the pressure at the inlet of the nozzle holder because at first vapor, respectively, gas bubbles must be filled out inside of the line path between the nozzle and the inlet of the nozzle holder. Thus, larger inaccuracies must again be accepted in the determination of the injection development, especially during the opening phase of the closure element of the injection valve.

In a further arrangement known from the publication, MTZ 30, (1969) 7, pages 238, et seq., the fact is utilized that the overall pressure during nonstationary operations is composed at some place of the injection system under consideration, for example, at the location of a pressure transducer arranged remote from the injection nozzle at a feed line of the injection medium, of a rest or quiescent pressure, of a pressure wave preceding to the injection nozzle as well as of a pressure wave returninng from the injection nozzle. As the pressure waves propagate with sound velocity, the phase displacement between the arrival of the preceding or leading pressure wave at the location of the pressure transducer and the arrival of this preceding pressure wave at the nozzle is determined practically exclusively by the length of the path between the location of the pressure transducer and the nozzle. The preceding pressure wave is reflected at the nozzle so that a returning pressure wave propagating again with sound velocity occurs whose running period from the nozzle to the location of the pressure transducer is again determined practically exclusively by the length of the corresponding path. Accordinng to the mentioned publication, the overall pressure measured by the pressure transducer is decomposed by calculation into preceding and returninng waves in order to calculate the respective overall pressure at the nozzle. Pressure sensors directly at the nozzle can be dispensed with therewith, instead the pressure at the nozzle can be determined from a greater distance.

Theoretically this known arrangement distinguishes itself by high accuracy. However, during the filling-out of gas and vapor bubbles, additional pressure waves occur in the injection medium. Additionally, the pressure waves already present in the injection medium are reflected at the gas, respectively, vapor bubbles. These effects have as a consequence that during the opening phase of the closure element of the injection valve considerable errors occur in the determination of the pressure condition at the injection nozzle, if the feed line for the injection medium has been relieved beforehand under formation of gas and vapor bubbles.

Though the injection development is a significant parameter for an optimum combustion progress in an engine, no suitable arrangements are known up to the present which permit an extraordinarily exact measurement, and more particularly also if, at the beginning of the injection operation, gas, respectively, vapor bubbles which had been produced prior thereto in the lines of the injection medium, must be filled with injection medium.

It is therefore the object of the present invention to provide an arrangement which permits to determine the injection course with high accuracy, notwithstanding the aforementioed difficulties also during the opening phase of the closure element of the injection valve.

The underlying problems are solved according to the present invention in that in an arrangement of the aforementioned type, the computer during the time interval of the stroke or lift movement of the closure element between the closing and opening position thereof determines by means of the signals of the stroke transmitter or lift pick-up or by means of the signals of a movement pick-up or transmitter reproducing the velocity of the closure element, determines the velocity and acceleration of the closure element and therefrom the pressure in the nozzle antechamber as well as the volumetric flow leaving the nozzle, respectively, the discharged quantity according to $$p_D \cdot A = m \cdot d^2h/dt^2 + R \cdot dh/dt + K \cdot h + F_1 + F_2 \quad \text{(I)}$$

$$dQ/dt = f(h,X)\sqrt{(p_D - p_G)\,2/Q} \quad \text{(II)}$$

$$Q = \int dQ/dt \quad \text{(III)}$$

whereby $p_D$=pressure in the nozzle antechamber, $p_G$=pressure in the combustion space, respectively, on the outlet side of the nozzle, A=cross section of the closure element acted upon by the pressure $p_D$ in the opening direction, m=mass of the closure element, h=stroke of the closure element, t=time, R=damping, respectively, friction coefficient of the stroke movement of the closure element, K=spring constant of the return force, $F_1$=prestress of the return force, $F_2$=friction force, Q=quantity of the injection medium discharged from the nozzle, $\rho$=density of the injection medium, f(h,X)=a predetermined function, dependent from the stroke (h) of the closure element and from the pressure factor X, and $X=(p_D-p_G)/p_G$=dimensionless pressure factor.

The present invention is predicated on the general concept to indicate the movement of the closure element between its closing and opening position and to determine therefrom the pressure in the nozzle antechamber, respectively, the flow of the injection medium passing through the nozzle or the discharge quantity thereof. This is possible because the respective path h traversed by the closure element, the velocity dh/dt of the closure element as well as the acceleration thereof $d^2h/dt^2$ can be determined, for according to equation I the hydraulic forces exerted by the injection medium on the closure element in the opening direction which are indicated on the left side of the equation I, correspond to the sum of the inertia force opposed by the closure element to a movement, of the friction, respectively, damping resistance opposing a movement of the closure element, of the return force and of the opening force, during the interaction of which the closure element disposed in the closing position commences to open. The particular advantage of the present invention resides in that gas, respectively, vapor bubbles present in the line between the injection valve and injection pump cannot lead to any errors in the determination of the injection course or development, for the stroke movement of the closure element commences only after a practically complete filling of the mentioned bubbles with injection medium.

The values for the cross section of the closure element acted upon by the pressure in the nozzle antechamber in the opening direction, for the mass of the closure element, for the damping, respectively, friction coefficients of the stroke movement of the closure element, for the spring constant of the return force, respectively, of the spring of the injection valve as well as for the prestress of the return force and the friction in the valve which are predetermined nonvariable by the construction of the injection valve, can be fixedly inputted to the computer, for example, by input of corresponding memory values. The same applies for the effective cross section of the nozzle, respectively, the function f(h,X) correlated thereto in equation II.

The pressure in the combustion space, respectively, on the outlet side of the nozzle which counteracts the pressure in the nozzle antechamber is generally of importance only during the needle closure phase. It can be determined by performance graph-interpolation or by an approximation, especially if, for example, with a reciprocating piston engine, the closing phase of the injection valve takes place during a time interval in which the respective piston of the engine assumes a position near its upper dead-center point.

However, the computer may possibly also take into consideration a variation of the combustion space pressure, respectively, of the pressure on the outlet side of the nozzle as a function of crankshaft angle or the like of the engine if the input side of the computer is connected with a corresponding measuring sensor.

Additionally, the volumetric flow can be determined also in approximation by means of the following equations.

$$dQ/dt = A_e(X\to\infty)\cdot\sqrt{1 + 1/X_{GR}}\cdot\sqrt{(p_D - p_G)\,2/Q} \quad \text{(IIa)}$$

if $X < X_{GR}$ $$dQ/dt = A_e(X\to\infty)\cdot\sqrt{2p_D/Q} \quad \text{(IIb)}$$

if $X \geqq X_{GR}$ where $X_{GR}$=limit pressure condition for which in the narrowest flow cross section the static pressure just reaches the value zero (depending on nozzle $X_{GR}=4\pm2$), $A_e(X)$=effective through-flow cross section of the nozzle, depending on pressure condition, and $A_e(X\rightarrow\infty)$=effective through-flow cross section at large pressure factors, for example, $X\geqq100$.

In these equations, it is taken into consideration that for all conditions with $X\geqq X_{GR}$—and this is the considerably larger proportion—the determination of nozzle counterpressure can be dispensed with because the pressure in the narrowest flow cross section of the injection nozzle has the value 0 [bar].

As soon as the closure element has reached its opened end position, the pressure in the nozzle antechamber, respectively, the flow passing through the nozzle or the discharged quantity of the injection medium can no longer be determined sufficiently accurately alone from the signals of the stroke transmitter or lift pick-up.

In principle, a determination of the flow passing through the nozzles or of the discharged quantity of the injection medium would also be possible in the opened end portion of the closure element if a stroke limitation determining the end position, an abutment arrangement or the like, possessed a sufficiently defined damping as well as a defined spring rate. The injection course could then be determined in all positions of the closure element exclusively from the signals of the stroke transmitter, respectively, of the movement transmitter. However, in practice, this is only possible with difficulty because the constructive expenditures, especially for the stroke limitation or the like, would be very large.

In one embodiment of the present invention, provision is now made to arrange a pressure transducer at the line between the injection pump and the injection valve whose output signals reproducing the line pressure are adapted to be fed to the input side of the computer whereby the computer with fully opened injection valve determines the pressure in the nozzle antechamber, respectively, the flow leaving the nozzle according to a predeterminable functional relationship between pressure in the nozzle antechamber and the line pressure determined by the pressure transducer.

In case the pressure transducer is arranged sufficiently close to the injection valve, the pressure in the nozzle antechamber and the line pressure at the pressure transducer can be set to be approximately equal. Possibly it is also feasible to continuously compare the pressure in the nozzle antechamber determined from the signals of the stroke transmitter with the values for the line pressure determined from the signals of the pressure transducer during the opening movement of the closure element and to determine a correction factor, with which the value of the line pressure must be multiplied in order to obtain an approximate value for the pressure in the nozzle antechamber.

In lieu thereof, it is also possible and preferably so provided with a view to as high an accuracy as possible of the arrangement, to determine the pressure in the nozzle antechamber taking into consideration the pressure waves which occur in the line, respectively, in the nozzle antechamber. For the following is valid for the pressure $p_X$ at the pressure transducer.

$$p_X=p_{XV}+p_{XR}=p_0 \qquad (IV)$$

whereby $p_O$ is the stationary pressure in this system, $p_{XV}$ the pressure of a pressure wave preceding in the direction of the injection valve and $p_{XR}$ the pressure of a pressure wave returning from the injection valve at the location of the pressure transducer. A corresponding equation is also valid for the pressure $p_D$ in the nozzle antechamber $$p_D=p_{DV}=p_{DR}+p_0 \qquad (V)$$

whereby $p_{DV}$ is the pressure of the pressure wave preceding to the nozzle and $p_{Dr}$ the pressure of the pressure wave returning from the nozzle. Furthermore, the following is valid $$p_{DV}(t)=p_{XV}(t=x/a) \qquad (VI)$$

$$p_{XR}(t)=p_{DR}(t=x/a) \qquad (VII)$$

whereby t is the time, x is the length of the line between the injection valve and the pressure transducer and a is the sound velocity in the injection medium.

The pressure in the nozzle antechamber can be calculated with increased accuracy on the basis of these relationships taking into consideration the line pressure determined by the pressure transducer, as will be explained more fully hereinafter.

The phases of the injection operation with moving closure element, respectively, with standing-still closure element—especially in the open position—can be determined in a simple manner in that the computer calculates higher derivatives of the progress with respect to time of the needle stroke and examines whether several of these derivatives assume extreme, respectively, zero values either simultaneously, respectively, in a time interval of predetermined short duration. More particularly, if the closure element upon termination of its opening stroke reaches its open end position, the stroke velocity of the closure element is necessarily changed nearly impact-like, whereby the mentioned higher derivatives assume extreme, respectively, zero values. The computer can therewith interpret the point in time of the simultaneous occurrence of extreme, respectively, zero values as the point in time for the fact that the closure element has reached its opened end position.

The same also applies upon reaching the closed end position, for also in that case the stroke velocity of the closure element is changed abruptly.

According to a further particularly preferred embodiment of the present invention, provision is made to measure in the opened end position of the closure element, the force $F_A$ with which the closure element is stressed in the direction of its open position; the computer can determine therewith the pressure $p_D$ in the nozzle antechamber according to the following equation:

$$p_D A=m\cdot d^2h/dt^2+R\cdot dh/dt+K\cdot h+F_1+F_2+F_A \qquad (Ia)$$

As long as the closure element moves in the opening, respectively, closing direction, $F_A=0$ is valid, for during these operatign phases, the force-measuring device is not acted upon by the closure element. Accordingly, the equation Ia is identical with the equation I during the opening, respectively, closing phase of the closure element. As soon as the closure element has reached its completely opened position, the two first terms on the right side of the equation Ia disappear if the closure element remains stationary in the completely open condition of the injection valve. During this phase, only the abutment force $F_A$ as well as the other terms predetermined by the construction of the injection valve need to be taken into consideration insofar as the closure element does not carry out any post-hunting or after-oscillations.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
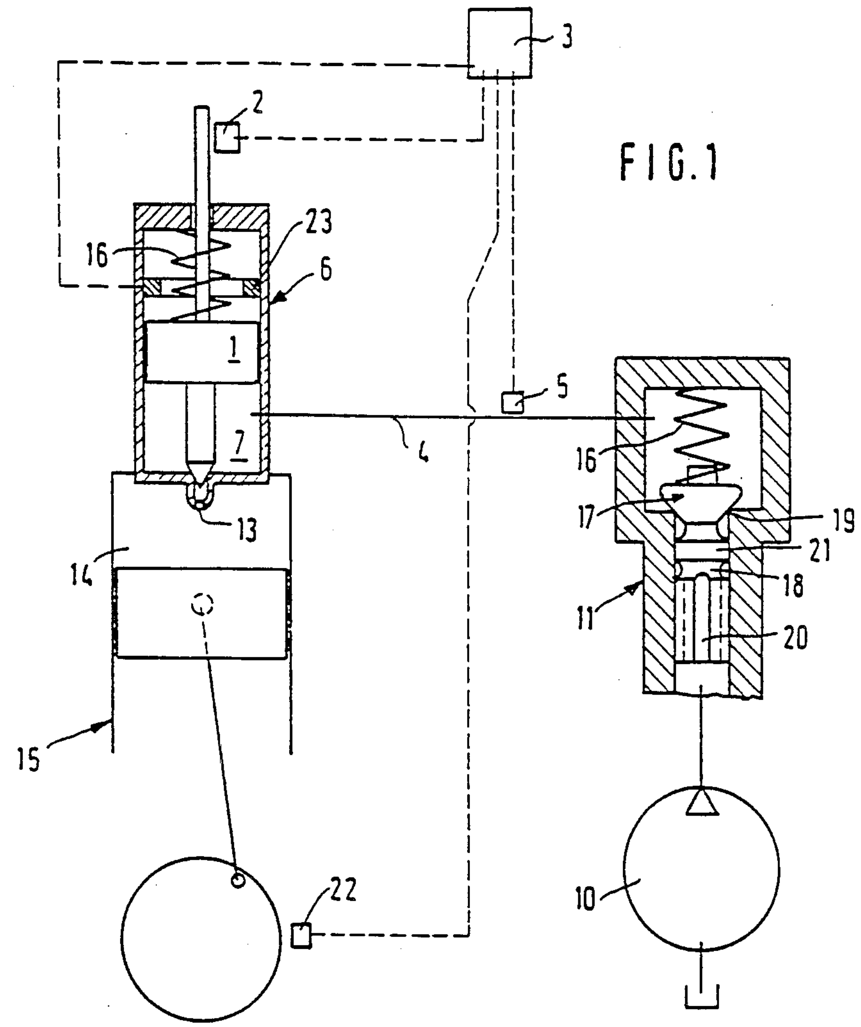
FIG. 1 is a schematic view of the injection system with the arrangement according to the present invention for the determination of the injection course.

Referring now to the drawing wherein like reference numerals are used throughout the various views to designate like parts, the injection system shown in FIG. 1 consists essentially of an injection pump 10 which feeds, by way of a pressure valve generally designated by reference numeral 11 and effective as check valve, a line 4 leading to an injection valve generally designated by reference numeral 6. A pressure transducer 5 is arranged at the line 4 at a distance x from the injection valve 6. The signals of the pressure transducer 5 reproducing the pressure in the line 4 are fed to a computer 3. The line 4 terminates inside of the injection valve 6 in a nozzle pre- or antechamber 7 which is connected by way of one or several nozzles 13, in the illustrated embodiment, directly with the combustion space 14 of an engine 15. In other engine constructions, the nozzles 13 may also terminate in a suction pipe or in a pre-chamber of the engine.

The nozzles 13 are controlled by the lower needle-like end of the closure element 1 of the injection valve 6, as viewed in FIG. 1. The closure element 1 is arranged in the manner of a piston inside of the valve housing of the injection valve 6, whereby the closure element 1 is acted upon in the opening direction by the pressure of the injection medium prevailing in the nozzle antechamber 7 and by a closure spring 16 in the closing direction. By reason of the prestress of the closing spring 16, a least a force F must be exerted on the closure element 1 in order that the closure element 1 commences to open.

The closure element 1 is drivingly coupled by means of a plunger or the like with an inductive stroke transmitter or lift pick-up 2 which produces output signals corresponding to the respective stroke or lift position h of the closure element 1 and transmits the same to the computer.

Figure 2:
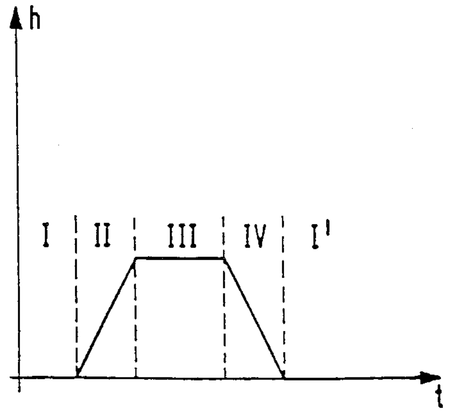
FIG. 2 is a graphic representation of the stroke phases of the injection valve.

FIG. 2 illustrates the stroke or lift phases of the closure element in a schematic view. At first, the closure element 1 in a phase I still assumes a closing position. If thereafter injection medium is introduced into the nozzle antechamber 7 by way of the line 4, then the closure element 1 opens in a phase II. The movement thereby takes place as a rule non-uniformly because initially gas, respectively, vapor bubbles are still present in the line 4, respectively, in the nozzle antechamber 7 which must be filled with injection medium. The creation of the gas, respectively, vapor bubbles will be explained more fully hereinafter. In a phase III, the closure element then assumes its opened end position. If the feed of injection medium by way of the line 4 is then terminated, the closure element 1 is returned during a phase IV into its closing position. The following phase I′ in which the closure element 1 assumes its closing position, corresponds to the phase I.

The formation of the mentioned gas and vapor bubbles in the line 4, respectively, in the nozzle antechamber chamber 7 during the phase I, respectively, I′ is based on the special construction of the pressure valve 11. The valve body 17 of the pressure valve 11 must be lifted from its closing position illustrated in FIG. 1 upwardly relatively far upwardly in order that the pressure valve 11 becomes passing to a significant degree. Only when an annular groove 18 on the valve body 17 reaches the area of the valve seat 19, injection medium can reach from the injection pump 10 by way of axial grooves 20 at the valve body 17 as well as the aforementioned annular groove 18 into the line 4. On the outlet side of the valve seat 19, the valve body 17 therefore acts in the manner of a displacement element as soon as an annular web 21 delimiting the annular groove 18 in the upward direction in FIG. 1 is slid into the bore leading to the valve body 17 on the inlet side of the valve seat 19. The line 4 during the closing stroke of the valve body 17 is correspondingly relieved under formation of gas, respectively, vapor bubbles. This is in principle desirable in order to avoid that uncontrolled squirts of the injection medium continue to leave the injection valve 6.

By reason of the relief effected by the valve body 17 and the formation of gas or vapor bubbles connected therewith, the measurement of the flow passing through the nozzle 13, respectively, of the discharge quantity of the injection medium is basically rendered difficult.

However, these difficulties are overcome in the arrangement according to the present invention.

During the opening phase of the closure element 1 of the injection valve 6, the pressure $p_D$ according to equation I can be determined by the computer 3 solely on the basis of the signals produced by the stroke transmitter 2 which reproduce the respective stroke position h. The flow dQ/dt, respectively, the discharged volume Q can then be determined according to the equations II and III. Possibly a constant average value may be used for the pressure $p_G$ in the combustion space 14. However, it is also possible to connect the computer 3 with a pressure detector at the combustion space so that in each case measured values of the combustion space pressure are available and can be processed in the computer. As to the rest, the computer 3 may be connected with a sensor 22 for the crankshaft angle and can process the crankshaft angle in lieu of the time t.

If at the beginning of the opening phase of the closure element 1, i.e., during the phases I and II in FIG. 2, vapor, respectively, gas bubbles are displaced and filled with injection medium, then this leads to a non-uniform opening movement of the closure element during phase II. This non-uniform movement, however, is contained as information in the signals of the stroke transmitter or lift pick-up so that the process of the filling of the gas, respectively, vapor bubbles with injection medium is necessarily taken into consideration in the computerized determination of the injection operation during the phase II in FIG. 2.

During the phase III in FIG. 2, no gas, respectively, vapor bubbles are present any longer in the line 4, respectively, in the injection valve 6. As the closure element 1 during this phase III no longer moves, but remains in its open end position, a calculation of the injection course by evaluation of the signals of the stroke transmitter 2 is no longer possible with sufficient accuracy.

However, a computation of the injection course is nonetheless possible if additionally the following continuity equations are taken into consideration.

$$dQ/dt = (2 \cdot p_{DV} - p_D + p_0) \cdot A_L/(Q \cdot a) - A \cdot dh/dt - \frac{V}{E} \cdot dp_D/dt \quad \text{(VIII)}$$

whereby

V=volume of the nozzle antechamber,
E=elasticity modulus of the injection member,
$p_D$=pressure in the nozzle antechamber,
t=time,
$p_{DV}$=pressure of the pressure wave preceding to the nozzle in the injection valve,
$p_O$=stationary pressure,
$A_L$=effective cross section of the line,
$\rho$=density of the injection medium,
a=sound velocity in the injection medium,
A=cross section of the closure element acted upon by the pressure $p_D$ in the opening direction,
h=stroke of the closure element, and
Q=quantity of the injection medium leaving the nozzle.

Equation VIII takes into consideration that the flow of the injection medium indicated on the left side of this equation and leaving the nozzles of the injection valve 6 is equal to the difference between the flow leading to the injection valve 6 (first term on the right side of the equation VIII) and the volume changes which occur by reason of the movement of the closure element as well as by reason of the compressibility of the injection medium, respectively, of the elasticity of the walls of the injection valve and the like (these volume changes are indicated in the second and third term on the right side of the equation VIII).

The equation VIII which is valid during the entire injection operation, is simplified during phase III as the closure element I does not move during this phase III and the second term on the right side of the equation VIII has correspondingly the value zero.

The injection course during the phase III can now be calculated approximately about as follows:

For a large number of time points t prior to the end of the phase II, the associated values of $p_D$ are computed. Furthermore, for the time points T the associated values of $dp_D/dt$ are calculated, for example, by calculating the difference quotient $[p_D(t_2)-p_D(t_1)]/(t_2-t_1)$, whereby $t_1$ and $t_2$ are time points closely ahead and closely after the respective time point t.

Additionally, the values of $p_D$ calculated for the time points t are inserted into equation II so that for the time points t the associated values of dQ/dt are available.

The values of $p_D$, $dp_D/dt$ and dQ/dt coordinated to a time point t are inserted into the equation VIII. As dh/dt is available in the operation VIII on the basis of the signals of the stroke transmitter or lift pick-up 2, the value of $p_{DV}$ coordinated to the time point t can now be determined from the equation VIII.

Finally, also the associated values of dh/dt can be determined for the time points t on the basis of the signals of the stroke transmitter 2.

The values of $p_D$, $dp_D/dt$, dQ/dt and dh/dt coordinated to the time points t are inserted into the equation VIII. The value of $p_{DV}$ can be calculated therewith for the respective time point t.

The values of $p_D$ and $p_{DV}$ determined for the time point t are inserted into equation V so that also the values of $p_{DR}$ coordinated to the respective time points t can be determined.

The values of $p_D$, $p_{DV}$ and $p_{DR}$ are therefore also available for the time points t.

The value $p_{DR}$ for the time point t is now inserted into the equation VII so that the value of $p_{XR}$ is available for the time point t+x/a.

The value of $p_X$ is now determined for the time point t+x/a, and more particularly by measurement by means of the pressure transducer 5.

This measured value is now inserted together with value of $p_{XR}$ determined previously for the time point t+x/a into the equation IV so that also the value of $p_{XV}$ is available for the time point t+x/a.

This value can now be inserted into the equation VI so that the value of $p_{DV}$ results for the time point t+2x/a.

As the value of $p_D$ can now be determined for the time point t+2x/a, as will be demonstrated hereinafter, the value of $p_{DR}$ for the time point t+2x/a can be determined from the equation V. The value of $p_{DR}$ for the time point t+4x/a can be calculated therefrom in a similar manner as the value of $p_{DR}$ for the time point t+2x/a from the value of $p_{DR}$ for the time point t.

The value of $p_D$ can be extrapolated for the time point t+2x/a as well as for further time points from the equations II and/or VIII by known numerical methods, for example, by the method of Runge and Kutta.

As the described calculations can be carried out repeatedly, starting from a large number of time points t following closely one another, the injection course during the phase III can be calculated for a sequence of similar closely following time points.

During the phase IV in FIG. 2, the injection course can be calculated selectively in the same manner as during the phase II or during the phase III. In the latter case, attention must be paid that the second term on the right side of the equation VIII is not equal to zero during the phase IV, i.e., the values for dh/dt derived from the signals of the stroke transmitter 2 must be taken into consideration in each case.

In order to be able to determine unequivocally the beginning and end of the phase II to IV, the computer 3 may calculate in each case higher derivatives with respect to time of the stroke of the closure element 1, respectively, of the corresponding signals of the stroke transmitter 2. As at the beginning and end of these phases several of these derivatives assume practically simultaneously extreme, respectively, zero values, the computer can examine without difficulty which phase of the injection operation exists at a given time.

For the calibration of the arrangement according to the present invention, a pressure transducer may be possibly arranged in the nozzle antechamber 7 which permits to measure the values of $p_D$ directly. Such pressure transducers may consist, for example, essentially of piezo-ceramic elements which produce a different electrical voltage depending on pressure admission.

It is thus possible to compare the measured values of $p_D$ directly with the respectively calculatd values and to insert correcting factors into the equations I, respectively, VIII for matching the calculated values to the measured values. In practice the accuracy of the calculated values can be therewith increased at will.

It is also possible in principle to leave the pressure transducer permanently in the nozzle antechamber 7 in order to measure directly the values of $p_D$ so that the injection course or progress could be calculated exclusively from the equations II and III. However, this is not possible in practice because the length of life of the pressure transducers with an arrangement in the nozzle antechamber 7 is relatively small, especially by reason of the thermal loading of the injection valve 6.

The calibration, respectively, correction of the effective through-flow cross sections—which might change by wear or coking—could take place by comparison of a defined volume with the calculatd summated injection quantity (for example, during engine servicing, eventually also from tanking to tanking).

In summary, it is noted that a determination of the injection course is possible with high accuracy by the arrangement according to the present invention, and more particularly during the entire length of engine life. For both the stroke transmitter 2 as also the pressure transducer 5 are only slightly loaded or stressed—especially also thermally—so that one can reckon with a long length of life.

In a further particularly preferred embodiment which also follows from FIG. 1, the closure element abuts in its fully opened position at an abutment constructed as force-measuring device 23. The force measuring device 23 is connected with the computer 3 which with completely opened injection valve 6 correspondingly receives signals that reproduce the force $F_A$ with which the closure element abuts at the force-measuring device 23. In this embodiment, the pressure transducer 5 at the line 4 can be dispensed with for with this embodiment according to the present invention the pressure $p_D$ in the nozzle antechamber 7 can be determined during the operating phases II to IV, compare FIG. 2, directly according to the equation Ia.

Figure 3:
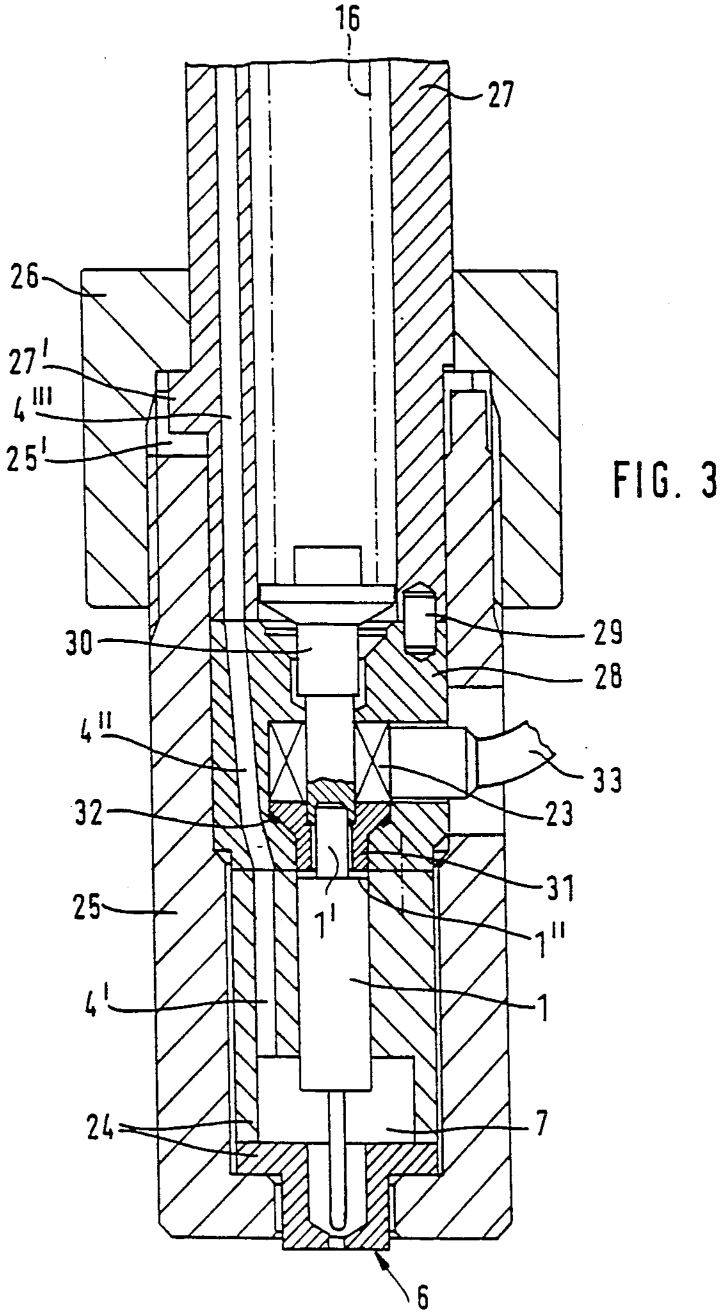
FIG. 3 is an axial cross-sectional view through a nozzle holder with a force-measuring device for the abutment force $F_A$ of the closure element of the injection valve in accordance with the present invention.

The injection valve 6, respectively, the mounting thereof are illustrated in a constructive manner in FIG. 3.

The injection valve includes a multi-partite nozzle body 24 with the plunger-like closure element 1 axially displaceably arranged therein and with the nozzle antechamber or prechamber 7 which is fed with the injection medium by way of the line section 4' extending through the nozzle body 24. The nozzle body 24 is received inside of a nozzle clamping nut 25 which, by means of a retaining nut 26 is connected with a cylindrical holding part 27 that protrudes into the nozzle clamping nut 25 and is clamped by means of the retaining nut 26 against an intermediate disk 28 inserted between the nozzle body 24 and the holding part 27, whereby at the same time, the nozzle body 24 is clamped into the nozzle clamping nut 25. The holding part 27 as well as the nozzle clamping nut 25 are nonrotatably coupled with each other inside of the retaining nut 26 in that a radial extension 27' of the retaining part 27 engages claw-like into an end-face axial aperture 25' of the clamping nut 25. As to the rest, the intermediate disk 28 is nonrotatably fixed at the holding part 27 by means of a fitting pin 29; in an in-principle similar manner the nozzle body 24 is nonrotatably retained at the intermediate disk 28 by means of a further fitting pin. It is assumed therewith that the line section 4' in the nozzle body 24 always communicates with the line sections 4'' and 4''' in the intermediate disk 28 and in the holding part 27, respectively.

The holding part 27 forms a cage for the closure spring 16 of the injection valve 6 which urges the closure element 1 thereof into the closing position by means of a mushroom-like pressure head 30 which is axially displaceably held in the intermediate disk 28.

The mushroom-like pressure head 30 is connected with the closure element 1 by means of a plunger arranged thereat which, in its turn, is coupled with the reduced axial extension 1' of the closure element 1. An annular step 1'' adjoins the extension 1' by means of which the closure element 1 abuts in its opened end position at an abutment member 31 axially displaceably arranged at the intermediate disk 28. The abutment member 31, in its turn, is urged by an elastic O-ring 32 against the force-measuring device 23 which is constructed as a piezo-element annularly shaped surrounding the plunger of the mushroom-like pressure head 30; the piezo-element is thereby inserted into the intermediate disk 28 through a lateral window of the nozzle clamping nut 25 as well as through a lateral aperture of the intermediate disk 28 arranged behind this window. With pressure actuation of the force-measuring device 23, respectively, of the piezo-element forming the force-measuring device 23, an electric voltage can be picked up at the same by way of electrodes arranged thereat (not shown), whose level changes with the pressure actuation of the piezo-element 23. This voltage is fed to the computer 3 (FIG. 1) by way of a cable 33 led out through the aperture as well as the window in the intermediate disk 28 and in the nozzle clamping nut 25. The computer 3 therewith receives signals which reproduce the force $F_A$, with which the closure element 1 is forced in its opened end position against the abutment member 31 by the hydraulic pressure of the injection medium in the nozzle antechamber 7.

Possibly also an elastically deformable element with strain gauge strips arranged thereat may be used as force-measuring device 23 which produce a signal reproducing the elastic deformation of the part and transmit the same to the computer 3. The computer 3 thus receives again a signal corresponding to the force $F_A$ so that the pressure $p_D$ in the nozzle antechamber 7 can again be calculated corresponding to the equation Ia.

The stroke transmitter or lift pick-up 2 schematically illustrated in FIG. 1 is omitted in FIG. 3 for reasons of simplicity. Such a stroke transmitter or lift pick-up 2 can cooperate with the mushroom-like pressure head 30, respectively, with a plunger-like extension arranged thereat or the like.

Differing from the illustration in FIG. 3, provision may also be made according to a preferred embodiment of the present invention that the cable is led out axially through the holding part 27 so that radial openings in the nozzle clamping nut 25 can be dispensed with. The installation of the injection valve in an engine is therewith considerably facilitated.

Therebeyond, the intermediate disk 28 itself may be constructed as force-measuring device, respectively, as piezo-element, i.e., the intermediate disk 28 produces a signal representing the force $F_A$.

Insofar as a movement transmitter is provided in lieu of the stroke transmitter 2 which produces a signal representing the velocity v of the closure element, the stroke h of the closure element can be determined by integration:

$$h=\int v\, dt$$

The acceleration of $d^2h/dt^2$ of the closure element then follows from differentiation:

$$d^2h/dt^2=dv/dt.$$

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arrangement for determining the injection course in an internal combustion engine, comprising injection pump means, injection valve means connected with the injection pump means by way of a line means, the injection valve means including an injection nozzle means operable to be closed by a closure means which is displaceably arranged in the manner of a piston in an antespace connected with the line means and is acted upon in the opening direction by the pressure of the injection medium supplied by way of the line means against a return force, stroke and movement transmitter means operatively coupled with the closure means, computer means for processing signals, said stroke and movement transmitter means being operatively connected with the input of the computer means, said signals reproducing the stroke movement and position of the closure means, the computer means being operable during the time interval of the stroke movement of the closure means between the closing and opening position thereof to determine by means of the sigals of the stroke and movement transmitter means the velocity and acceleration of the closure means and therefrom the pressure in the antechamber as well as the volumetric flow leaving the nozzle means, respectively, the discharge quantity according to the following equations:

$$p_D \cdot A=m \cdot d^2h/dt^2+R \cdot dh/dt+K \cdot h+F_1+F_2 \quad \text{(I)}$$

$$dQ/dt + f(h,X)\sqrt{(p_D-p_G)\,2/\rho} \quad \text{(II)}$$

$$Q=\int dQ/dt \quad \text{(III)}$$

whereby $p_D$=pressure in the nozzle antechamber, $p_G$=pressure in the combustion space, respectively, on the outlet side of the nozzle, A=cross section of the closure element acted upon by the pressure $p_D$ in the opening direction, m=mass of the closure element, h=stroke of the closure element, t=time, R=damping, respectively, friction coefficient of the stroke movement of the closure element, K=spring constant of the return force, $F_1$=prestress of the return force, $F_2$=friction coefficient, Q=quantity of the injection medium leaving the nozzle, $\rho$=density of the injection medium, f(h,X)=a predetermined function, dependent on the stroke (h) of the closure element and on the pressure factor X, and $X=(p_D-p_G)/p_G$=dimensionless pressure factor.

2. An arrangement according to clam 1, wherein the volumetric flow (dQ/dt) is calculated according to the following equations:

$$dQ/dt = A_e(X\rightarrow\infty)\cdot\sqrt{1+1/X_{GR}}\cdot\sqrt{(p_D-p_G)\,2/Q} \quad \text{(IIa)}$$

if $X < X_{GR}$ $$dQ/dt = A_e(X\rightarrow\infty)\cdot\sqrt{2p_D/Q} \quad \text{(IIb)}$$

if $X \geqq X_{GR}$ whereby $X_{GR}$=pressure condition for which the static pressure in the narrowest flow cross section just reaches the value zero (depending on nozzle $X_{GR}=4\pm2$), $A_e(X)$=effective through-flow cross section of the nozzle, dependent on pressure condition, and $A_e(X\rightarrow\infty)$=effective through-flow cross section at large pressure factors, for example, $X \geqq 100$.

3. An aarrangement according to claim 2, wherein the computer means calculates higher derivatives of the progress with respect to time of the needle stroke ($d^nh/dt^n$, whereby $n\geqq 2$) and examines whether several of these derivatives assume simultaneously or in a time interval of predetermined length extreme, respectively, zero positions, and wherein the computer means evaluates the point in time of such an occurrence as beginning, respectively, end of the opening, respectively, closing movement of the closure means.

4. An arrangement according to claim 1, wherein a pressure transducer means is arranged at the line means whose output signals reproducing the line pressure at the location of the pressure transducer means are operable to be fed to the input side of the computer means, and wherein the computer means determines at least with completely opened closure means the pressure in the nozzle antechamber, respectively, the volumetric flow leaving the nozzle means according to a predeterminable functional relationship between the pressure in the nozzle antechamber and the line pressure determined by the pressure transducer means.

5. An arrangement according to claim 4, wherein the computer means during the closing stroke of the closure means determines the pressure in the nozzle antechamber, respectively, the volumetric flow leaving the nozzle means according to the same predeterminable functional relationship between pressure in the nozzle antechamber and the line pressure determined by the pressure transducer means.

6. An arrangement according to claim 4, wherein the computer means for the closing stroke of the closure means determines the pressure in the nozzle antechamber, respectively, the volumetric flow leaving the nozzle means with the same mathematical operation as during the opening stroke.

7. An arrangement according to claim 6, wherein the closure means is operatively coupled with an inductive stroke or movement transmitter means.

8. An arrangement according to claim 1, wherein the closure means abuts in its open position at a force-measuring means whose signals are fed to the computer means and reproduce with what force the closure means is stressed in the direction of its open position, and wherein the computer means determines the pressure in the nozzle antechamber according to the following equation:

$$p_D A = m \cdot d^2h/dt^2 + R \cdot dh/dt + K \cdot h + F_1 + F_2 + F_A \quad \text{(Ia)}$$

9. An arrangement according to claim 8, wherein at least a piezo-element is arranged as force-measuring means.

10. An arrangement according to claim 9, wherein the piezo-element serves directly as abutment means for the closure means.

11. An arrangement according to claim 9, wherein the piezo-element is indirectly operatively connected with an abutment means of the closure means.

12. An arrangement according to claim 8, wherein at least one strain gauge means is arranged as force-measuring means at an abutment means of the closure means.

13. An arrangement according to claim 7, wherein the effective stroke of the closure means between the opened end position and the closing position is determined by means of the stroke, respectively, movement transmitter means and a characteristic magnitude is determined therefrom for the nozzle needle wear.

14. An arrangement according to claim 7, wherein the computer means during the closing stroke of the closure means determines the pressure in the nozzle antechamber, respectively, the volumetric flow leaving the nozzle means according to the same predeterminable functional relationship between pressure in the nozzle antechamber and the line pressure determined by the pressure transducer means.

15. An arrangement according to claim 6, wherein the stroke transmitter means is constructed as Hall pick-up.

16. An arrangement according to claim 1, wherein the computer means calculates higher derivatives of the progress with respect to time of the needle stroke ($d^nh/dt^n$, whereby $n \geqq 2$) and examines whether several of these derivatives assume simultaneously or in a time interval of predetermined length extreme, respectively, zero positions, and wherein the computer means evaluates the point in time of such an occurrence as beginning, respectively, end of the opening, respectively, closing movement of the closure means.

17. An arrangement according to claim 1, wherein the closure means is needle-like in shape.

18. An arrangement according to claim 1, wherein a pressure transducer means is arranged at the line means whose output signals reproducing the line pressure at the location of the pressure transducer means are operable to be fed to the input side of the computer means, and wherein the computer means determines at least with completely opened closure means the pressure in the nozzle antechamber, respectively, the volumetric flow leaving the nozzle means according to a predeterminable functional relationship between the pressure in the nozzle antechamber and the line pressure determined by the pressure transducer means.

19. An arrangement according to claim 1, wherein the computer means for the closing stroke of the closure means determines the pressure in the nozzle antechamber, respectively, the volumetric flow leaving the nozzle means with the same mathematical operation as during the opening stroke.

20. An arrangement according to claim 19, wherein the effective stroke of the closure means between the opened end position and the closing position is determined by means of the stroke, respectively, movement transmitter means and a characteristic magnitude is determined therefrom for the nozzle needle wear.

21. An arrangement according to claim 1, wherein the closure means abuts in its open position at a force-measuring means whose signals are fed to the computer means and reproduce with what force the closure means is stressed in the direction of its open position, and wherein the computer means determines the pressure in the nozzle antechamber according to the following equation:

$$p_D A = m \cdot d^2h/dt^2 + R \cdot dh/dt + K \cdot h + F_1 + F_2 + F_A \quad \text{(Ia)}$$

22. An arrangement according to claim 21, wherein at least a piezo-element is arranged as force-measuring means.

23. An arrangement according to claim 22, wherein the piezo-element serves directly as abutment means for the closure means.

24. An arrangement according to claim 22, wherein the piezo-element is indirectly operatively connected with an abutment means of the closure means.

25. An arrangement according to claim 22, wherein at least one strain gauge means is arranged as force-measuring means at an abutment means of the closure means.

26. An arrangement according to claim 1, wherein the stroke transmitter means is constructed as Hall pick-up.

* * * * *